INVENTOR.
DANIEL H. PRUTTON

INVENTOR.
DANIEL H. PRUTTON
BY
ATTORNEYS

Oct. 5, 1965             D. H. PRUTTON             3,209,900

OSCILLATING AND RECIPROCATING VIBRATORY HOPPER

Filed Jan. 23, 1964             3 Sheets-Sheet 3

INVENTOR.
DANIEL H. PRUTTON
BY
ATTORNEYS

United States Patent Office 3,209,900
Patented Oct. 5, 1965

3,209,900
OSCILLATING AND RECIPROCATING
VIBRATORY HOPPER
Daniel H. Prutton, Cleveland, Ohio
(Rte. 1, Box 333, Englewood, Fla.)
Filed Jan. 23, 1964, Ser. No. 339,740
14 Claims. (Cl. 198—220)

The invention relates in general to vibratory feeders and more particularly to a vibratory hopper feeder which may be used to feed small parts by vibratory movement from a hopper to a discharge means.

Vibratory hopper feeders have been used to feed many types of small parts to machines such as assembly machines utilizing the small parts. Such small parts are often difficult to handle because of their small size but must be fed one by one in a particular attitude to the utilization machine. Some prior art forms of vibratory hoppers have utilized cantilever leaf spring suspension which springs must be flexed to provide vibratory movement and others utilized air pressure motors for the vibratory movement. In both of these cases an excessive amount of power was required to provide the vibratory feed movement and were sensitive to the variations in the total weight of parts in the hopper.

Accordingly, an object of the invention is to provide a vibratory feeder overcoming the above objections.

Another object of the invention is to provide a vibratory feeder wherein the amount of weight of parts in the hopper has little effect on the vibratory action.

Another object of the invention is to provide a vibratory feeder wherein a rotating eccentric mass provides vibration.

Another object of the invention is to provide a vibratory hopper feeder wherein a rotating eccentric mass provides arcuate vibration which in turn establishes vertical vibration.

The invention may be incorporated in a vibratory feeder comprising a ramp means carried on a base for arcuate and vertical movement about a first vertical axis, said ramp means sloping upwardly to discharge means, first and second support means, one connected to said ramp means and the other connected to said base, height cam means carried in said first support means at an angle to the horizontal and on a radius from said first vertical axis, cam follower means on said second support means and coacting with said height cam, arcuate vibratory means connected to said ramp means relative to said base, said arcuate vibratory means including a rotary mass on a second axis, and drive means connected to drive said rotary mass to eccentric positions relative to said first vertical axis and acting on said ramp means.

Other objects and a fuller understanding of this invention may be had by referring to the following description and claims, taken in conjunction with the accompanying drawings, in which:

Figure 1:
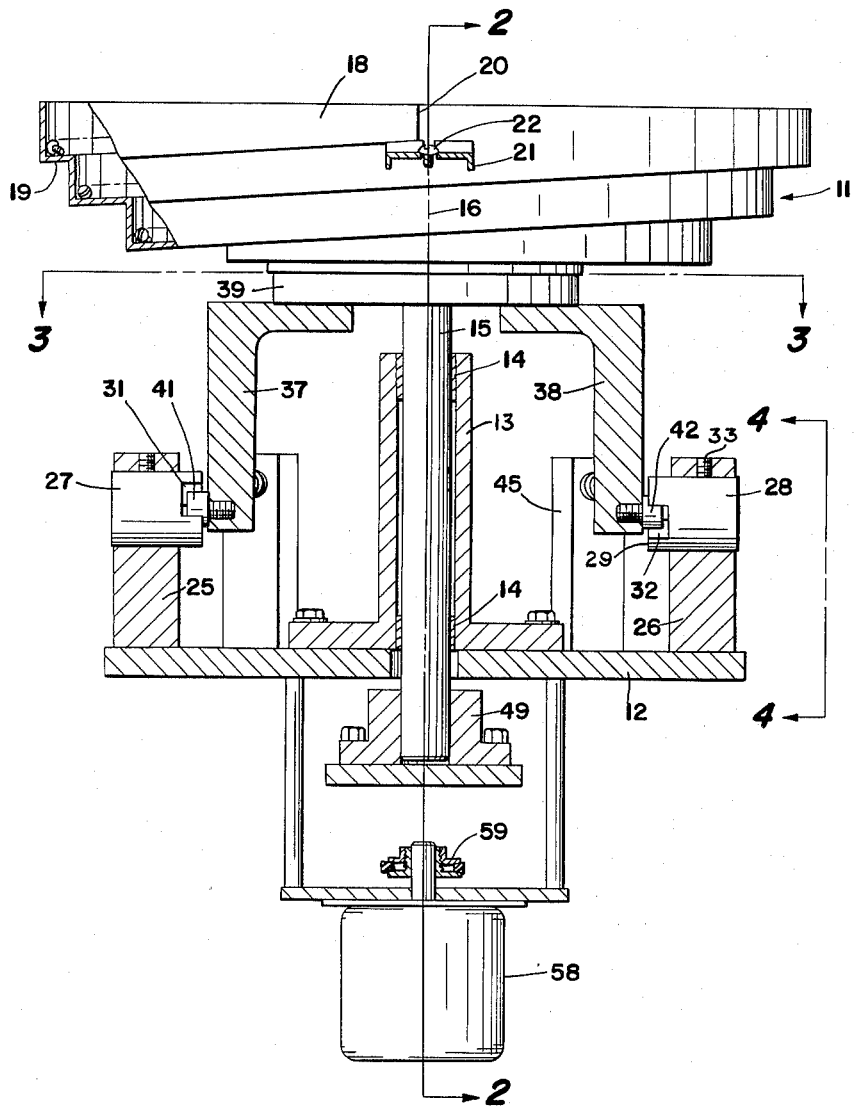
FIGURE 1 is a vertical elevation partly in section on line 1—1 of FIGURE 2 showing a vibratory feeder embodying the invention.
Figure 2:
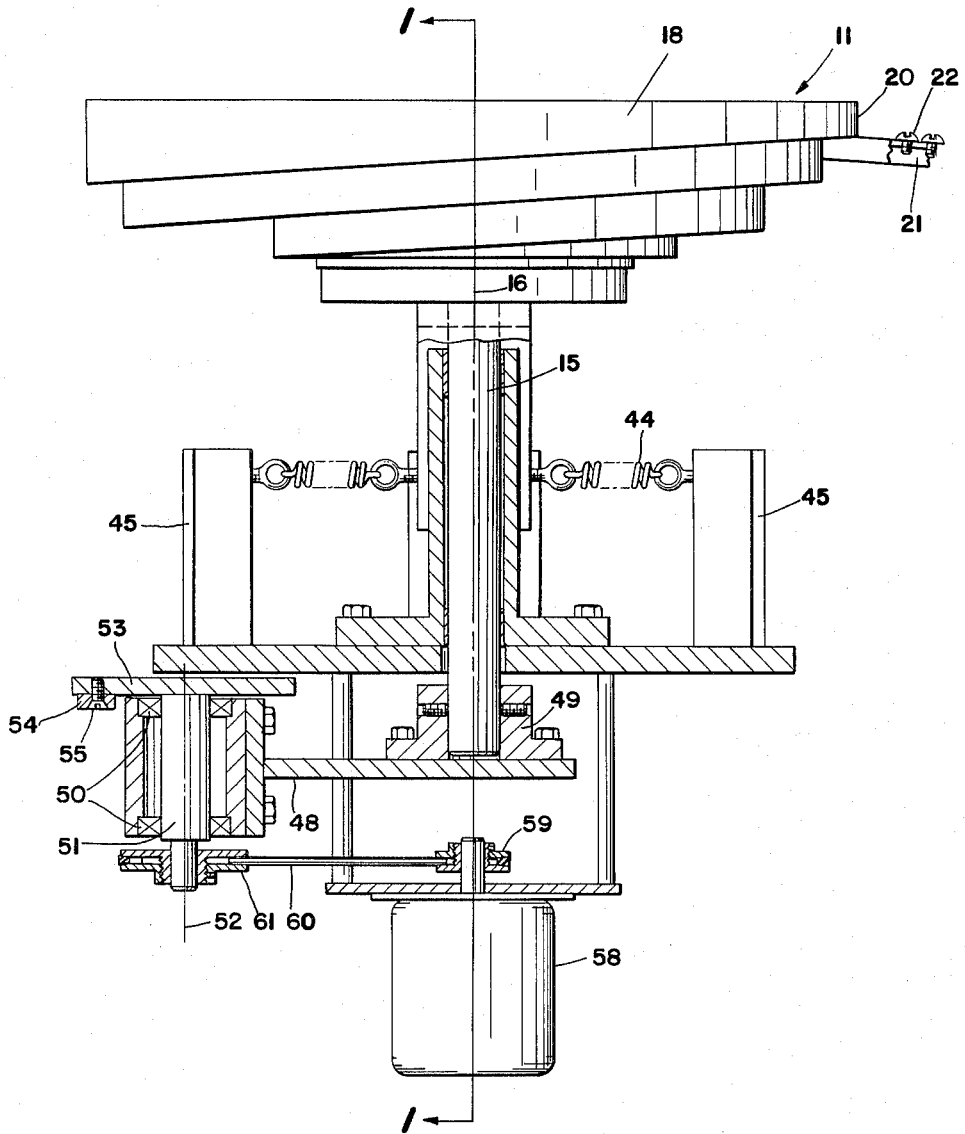
FIGURE 2 is a sectional view on line 2—2 of FIGURE 1.
Figure 3:
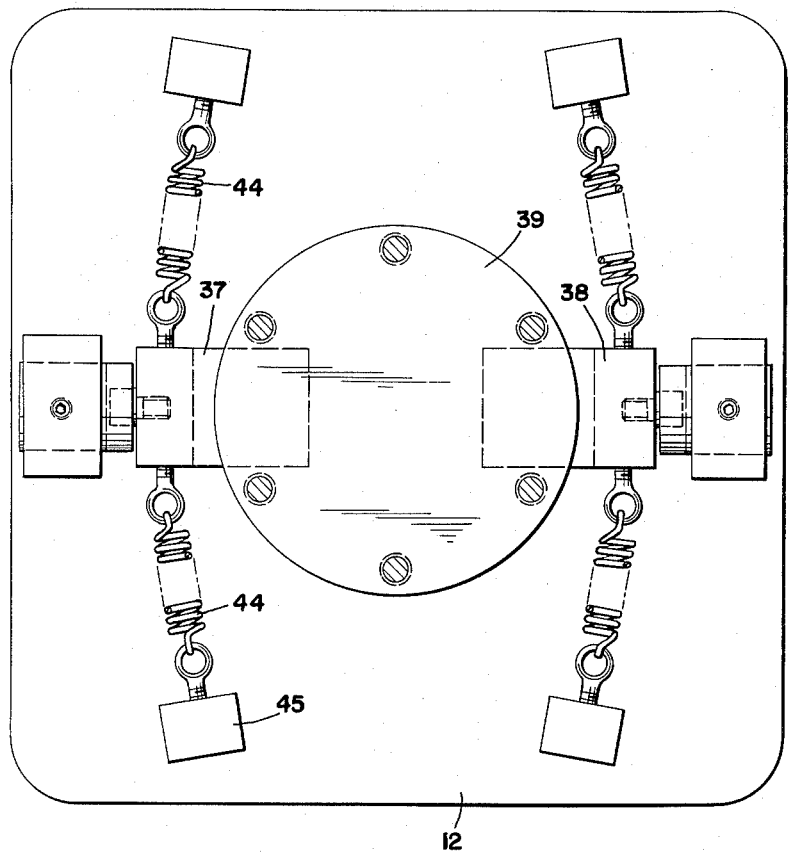
FIGURE 3 is a sectional view on line 3—3 of FIGURE 1.

The figures of the drawing show a vibratory feeder 11 having a base 12 fixedly mounting a sleeve 13. This sleeve has sleeve bearings 14 journalling a first shaft 15 on a vertical axis 16 for arcuate and vertical sliding movements. A hopper 18 is fixedly carried on the upper end of the shaft 15. A spiral ramp 19 is shown as being part of the hopper 18 and is in the outer perimeter of this hopper generally spiraling upwardly from a small diameter at the bottom of the hopper 18 to a large diameter at the top of the hopper. A discharge opening 20 is provided at the upper end of the ramp 19 and communicates with a part chute 21 so that parts 22 may be vibratorily fed up the ramp 19 to the top of the chute 21 and there disposed in a predetermined attitude for gravity feed down the chute 21. These parts 22 have been illustrated as machine screws but they may be any of many different forms of parts and the part chute 21 is illustrative of a chute which will feed these parts, in this case by gravity, to a utilization machine, not shown.

Figure 4:
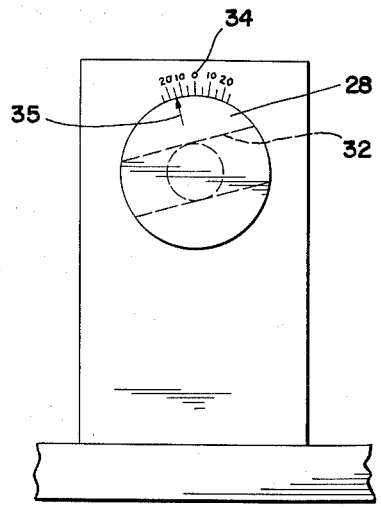
FIGURE 4 is a sectional view on line 4—4 of FIGURE 1.

The base 12 carries first and second standards 25 and 26. These standards are supports having a cylindrical aperture therein carrying cylindrical plugs 27 and 28 respectively. Each plug has an inner face 29 with height cams 31 and 32 formed by slots in the inner face of the respective plugs. Set screws 33 are used to rotationally fix each plug in the respective standard and, accordingly, are capable of permitting adjustment of each height cam slotted surface relative to the horizontal. To aid in this adjustment the standards may carry indicia 34 cooperating with a reference mark 35 on the plugs as shown in the FIGURE 4.

First and second arms 37 and 38 depend from a plate 39 at the base of the hopper 18. These arms 37 and 38 carry cam follower rollers 41 and 42, respectively, to coact with the height cams 31 and 32, respectively. Torsion spring means include four coil springs 44, each extending between a depending arm 37 or 38 and posts 45 upstanding from the base 12. These torsion springs 44 act to substantially center the cam follower rollers on the respective height cams.

A lateral arm 48 is fixed to a collar 49, in turn fixed to the bottom of the shaft 15. The lateral arm 48 extends horizontally and at the outer end thereof bearings 50 journal a mass shaft 51 on a second vertical axis 52. A rotating plate 53 is fixed on the upper end of the mass shaft 51 and a weight or mass 54 is fastened by a screw 55 to this rotating plate 53. A motor 58 is fixed on the base 12 and drives through an adjustable pulley 59, a belt 60 and another adjustable pulley 61 to the mass shaft 51.

Operation

The motor drives through the belt drive to the eccentrically positioned mass 54 which is eccentric to the second vertical axis 52 as well as to the first vertical axis 16. Rotation of this eccentric mass 54 imparts an arcuate vibration to the hopper 18. This arcuate vibration may be in the order of 450 to 1200 vibrations per minute as achieved by a conventional 1750 r.p.m. motor 58 and the speed reduction of the belt drive. With a hopper 18 of 24 inches diameter it has been found that this will provide an arcuate vibration of about ½ inch or perhaps ⅜ inch maximum at the outer periphery of the hopper. The height cams are of greater circumferential extent to prevent the rollers 41 and 42 from disengaging therewith. The torsion springs 44 maintain the cam follower rollers in engagement with the height cams.

The arcuate vibration caused by the rotating eccentric mass 54 establishes a vertical vibration depending on the angle of the height cams 31 and 32. Preferably these height cams slope upwardly in the same direction as the spiral ramp 19. For parts 22 of heavy weight, it has been found generally necessary to establish the height cams at an angle in excess of the slope of the spiral ramp 19. However, for lighter parts 22 often a slope of the height cams the same as the slope of the spiral ramp is satisfactory. Where the slope of the height cam is greater than the slope of the spiral ramp, the parts being vibratorily fed up the ramp tend to lift off the surface of the ramp with each vibration. This results in a pounding of the parts on the ramp which tends to wear both the parts and the ramp so it is often preferred to keep the lifting of the parts to a minimum and hence adjust the angle of the height cams to a minimum slope. In this case the parts 22 are in a sense just jiggled up the slope without being raised off the surface of the ramp.

It has been observed that the preferred direction of rotation of the eccentric mass 54 is counterclockwise, looking downwardly on the topper 18, when the ramp 19 has a counterclockwise direction of increasing height.

The entire vibratory feeder may be adjusted for proper vibratory feed of different weight parts by adjusting any of three parameters, including the weight of the eccentric mass 54, the rotational speed thereof, as by the adjustable pulleys 59 and 61, and adjusting the angle of the height cams 31 and 32. It has been observed that the changing total weight of all the parts in the hopper 18, that is, between a full hopper and a nearly empty hopper, has practically no effect on the vibratory feed of the parts up the ramp. This is a very advantageous feature because it means that the three parameters need not be readjusted constantly during feeding and as the hopper slowly empties, which has been a disadvantage with prior vibratory feeders.

It has also been observed that this feeder operates with considerably less horsepower input than prior vibratory feeders requiring only about one-fourth horsepower for a 24-inch diameter hopper, whereas prior vibratory hopper feeders of the same size and with the same parts being fed but which utilized cantilever leaf spring support or air pressure vibratory means required from two to ten times as much power for operation.

The rotating eccentric mass 54 is part of the arcuate vibratory means for the hopper 18 and the mass 54 acts on the hopper 18 and hence the ramp 19 at least when this mass 54 is in an eccentric position relative to the vertical axis 16.

The depending arms 37 and 38 are supports to attach the cam follower rollers 41 and 42 to the hopper 18 and thus impart the vertical movement to the ramp 19 upon arcuate vibration between the cam followers and the height cams.

Although this invention has been described in its preferred method with a certain degree of particularity, it is understood that the present disclosure of the preferred method has been made only by way of example and that numerous changes in the details of the method may be resorted to without departing from the spirit and the scope of the invention as hereinafter claimed.

What is claimed is:

1. A vibratory feeder, comprising, in combination a base, ramp means carried on said base for arcuate and vertical movement about a first vertical axis, said ramp means sloping upwardly to discharge means, first and second support means, one connected to said ramp means and the other connected to said base, height cam means carried in said first support means at an angle to the horizontal and on a radius from said first vertical axis, cam follower means on said second support means and coacting with said height cam, arcuate vibratory means connected to said ramp means relative to said base, said arcuate vibratory means including a rotary mass on a second axis, and drive means connected to drive said rotary mass to eccentric positions relative to said first vertical axis and acting on said ramp means.

2. A vibratory feeder, comprising, in combination a base, ramp means carried on said base for arcuate and vertical movement about a first vertical axis, said ramp means sloping upwarly to discharge means, hopper means to supply parts to a lower end of said ramp means, first and second support means, one connected to said ramp means and the other connected to said base, height cam means carried in said first support means at an angle to the horizontal and on a radius from said first vertical axis, cam follower means on said second support means, spring means acting to position said cam follower means in cooperation with said height cam means, arcuate vibratory means connected to said ramp means relative to said base, said arcuate vibratory means including a rotary mass on a second axis, and a motor connected to drive said rotary mass to eccentric positions relative to said first vertical axis and acting on said ramp means.

3. A vibratory hopper feeder, comprising, in combination a base, a hopper carried on said base, ramp means in said hoper sloping upwarly to discharge means and mounted for arcuate and vertical movement about a first vertical axis, first and second supports, one connected to said hopper and the other connected to said base, a height cam carried in said first support at an angle to the horizontal and on a radius from said first vertical axis, a cam follower on said second support, spring means acting to position said cam follower in cooperation with said height cam, arcuate vibratory means connected to said hopper relative to said base, said arcuate vibratory means including a rotary shaft on a second axis, a motor connected to drive said rotary shaft, and an eccentric mass rotated with said shaft and having eccentric positions relative to said first vertical axis and in an eccentric position acting on said hopper.

4. A vibratory hopper feeder, comprising, in combination a base, a hopper carried on said base for arcuate and vertical movement about a first vertical axis, ramp means in said hopper curving upwardly to a discharge opening, first and second supports, one connected to said hopper and the other connected to said base, a height cam carried in said first support at an angle to the horizontal and on a radius from said first vertical axis, a cam follower on said second support, spring means acting to position said cam follower on said height cam, arcuate vibratory means connected to said hopper, said arcuate vibratory means including a rotary shaft on a second vertical axis, a motor connected to drive said rotary shaft, and an eccentric mass rotated with said shaft and having eccentric positions relative to said first vertical axis and in an eccentric position acting on said hopper.

5. A vibratory hopper feeder, comprising, in combination, a base, a hopper carried on said base for arcuate and vertical movement about a first vertical axis, a spiral ramp in the perimeter of said hopper spiraling upwardly from near the bottom of said hopper to a discharge opening near the upper end thereof to discharge parts therefrom carried in said hopper, first and second supports, one connected to said hopper and the other connected to said base, a height cam carried in said first support on a radius from said first vertical axis, means to adjust the angle of said height cam in said first support relative to the horizontal, a cam follower roller journalled on said second support and positioned to roll on said height cam, spring means acting to position said cam follower roller on said height cam, arcuate vibratory means connected to said hopper, said arcuate vibratory means including a rotary shaft on a second vertical axis, a motor connected to drive said rotary shaft, and an eccentric mass rotated with said shaft and having eccentric positions relative to said first vertical axis and in an eccentric position acting on said hopper, whereby rotation of said motor causes said arcuate vibratory means to impart arcuate vibration to said hopper to cause said cam follower to coact with said height cam to impart vertical vibration to said hopper to cause any parts in said hopper to be vibrationally advanced up said spiral ramp to said discharge opening.

6. A vibratory hopper feeder, comprising, in combination, a base, a hopper carried on said base for arcuate and vertical movement about a first vertical axis, a spiral ramp in the perimeter of said hopper spiraling upwardly from the bottom of said hopper to a discharge opening at the upper end thereof to discharge parts therefrom carried in said hopper, first and second supports, one on said hopper and the other on said base, a rotatable plug carried in said first support, a height cam formed in a face of said rotatable plug on a radius from said first vertical axis, means to adjustably clamp said rotatable plug in said first support at different positions to adjust the angle of said height cam relative to the horizontal, a cam follower roller journalled on said second support and positioned to roll on said height cam, spring means acting to position said cam follower roller on said height cam, arcuate vibratory means connected to said hopper, said arcuate vibratory means including a rotary shaft on a second vertical axis, a motor connected to drive said rotary shaft, and an eccentric mass rotated with said shaft and having eccentric positions relative to said first vertical axis and in an eccentric position acting on said hopper, whereby rotation of said motor causes said arcuate vibratory means to impart arcuate vibration to said hopper to cause said cam follower to coact with said height cam to impart vertical vibration to said hopper to cause any parts in said hopper to be virationally advanced up said spiral ramp to said discharge opening.

7. A vibratory hopper feeder, comprising, in combination a base, a hopper carried on said base for arcuate and vertical movement about a first vertical axis, a spiral ramp in the perimeter of said hopper spiraling upwardly from the bottom of said hopper to a discharge opening at the upper end thereof to discharge parts therefrom carried in said hopper, first and second supports, one on said hopper and the other on said base, a cylindrical plug journalled in said first support, a height cam formed in a face of said cylindrical plug on a radius from said first vertical axis, screw means to adjustably clamp said cylindrical plug in said first support at different positions to adjust the angle of said height cam relative to the horizontal, a cam follower roller journalled on said second support and positioned to roll on said height cam, torsion spring means acting to substantially center said cam follower roller on said height cam, arcuate vibratory means connected to said hopper, said arcuate vibratory means including a rotary shaft on a vertical axis, a motor, a belt drive from said motor to said rotary shaft, and an eccentric mass rotated with said shaft and having eccentric positions relative to said first vertical axis and in an eccentric position acting on said hopper, whereby rotation of said motor causes said arcuate vibratory means to impart arcuate vibration to said hopper to cause said cam follower to coact with said height cam to impart vertical vibration to said hopper to cause any parts in said hopper to be vibrationally advanced up said spiral ramp to said discharge opening.

8. A vibratory hopper feeder, comprising, in combination, a base, a hopper carried on said base for arcuate and vertical movement about a first vertical axis, a spiral ramp in the perimeter of said hopper spiraling upwardly from the bottom of said hopper to a discharge opening at the upper end thereof to discharge parts therefrom carried in said hopper, a cylindrical plug carried in said base, a height cam formed in a face of said cylindrical plug on a radius from said first vertical axis, means to adjust said cylindrical plug to adjust the angle of said height cam relative to the horizontal, a cam follower roller journalled relative to said hopper and positioned to roll on said height cam, spring means acting to substantially center said cam follower roller on said height cam, arcuate vibratory means connected to said hopper said arcuate vibratory means including a rotary shaft on a vertical axis, a motor, a belt drive from said motor to said rotary shaft and an eccentric mass rotated with said shaft and having eccentric positions relative to said first vertical axis and in an eccentric position acting on said hopper, whereby rotation of said motor causes said eccentric mass to impart arcuate vibration to said hopper to cause said cam follower to ride up on said height cam to impart vertical vibration to said hopper to cause any parts in said hopper to be vibrationally advanced up said spiral ramp to said discharge opening.

9. A vibratory hopper feeder, comprising, in combination, a base, a hopper carried on said base for arcuate and vertical movement about a first vertical axis, a spiral ramp in the perimeter of said hopper spiraling upwardly from the bottom of said hopper to a discharge opening at the upper end thereof to discharge parts therefrom carried in said hopper, a standard on said base, a cylindrical plug journalled in said standard, a height cam formed in a face of said cylindrical plug on a radius from said first vertical axis, threaded means to adjustably clamp said cylindrical plug in said standard at different positions to adjust the angle of said height cam relative to the horizontal, an arm depending from said hopper, a cam follower roller journalled on the end of said depending arm and positioned to roll on said height cam, torsion spring means acting on said depending arm substantially centering said cam follower roller on said height cam, a motor, arcuate vibratory means connected to said hopper, a drive from said motor to said arcuate vibratory means, said arcuate vibratory means including a rotary shaft on a second vertical axis, and an eccentric mass rotated with said shaft and having eccentric positions relative to said first vertical axis and in an eccentric position acting on said hopper, whereby rotation of said motor and shaft causes said arcuate vibratory means to impart arcuate vibration to said hopper to cause said cam follower to ride upon said height cam to impart vertical vibration to said hopper to cause any parts in said hopper to be vibrationally advanced up said spiral ramp to said discharge opening.

10. A vibratory hopper feeder, comprising, in combination, a base, a vertical main shaft journalled on said base for rotating and vertical sliding movement, a hopper fixed on the upper end of said shaft, a spiral ramp in the perimeter of said hopper spiraling upwardly from a smaller diameter at the bottom of said hopper to a larger diameter at the top of said hopper, a discharge opening at the upper end of said spiral ramp to discharge parts carried in said hopper and conveyed up said spiral ramp, a standard on said base, a cylindrical plug journalled in said standard, a height cam formed in an inner face of said cylindrical plug, screw means to adjustably clamp said cylindrical plug in said standard at different positions to adjust the angle of said height cam relative to the horizontal, an arm depending from said hopper, a cam follower roller journalled on the end of said depending arm and positioned to roll on said height cam, torsion spring means acting on said depending arm substantially centering said cam follower roller on said height cam, a motor, arcuate vibratory means connected to said hopper, a belt drive from said motor to said arcuate vibratory means, said arcuate vibratory means including a rotary second shaft on a vertical axis, and an eccentric mass rotated with said second shaft and having eccentric positions relative to said vertical main shaft and in an eccentric position acting on said hopper, whereby rotation of said motor causes said arcuate vibratory means to impart arcuate vibration to said hopper to cause said cam follower to ride up on said height cam to impart vertical vibration to said hopper to cause any parts in said hopper to be vibrationally advanced up said spiral ramp to said discharge opening.

11. A vibratory hopper feeder, comprising, in combination, a base hopper carried on said base for arcuate and vertical vibratory movements about a vertical axis, a spiral ramp in the perimeter of said hopper spiraling upwardly to a discharge opening at the upper end thereof to discharge parts therefrom, a standard on said base, a height cam carried on said base, means to adjust the angle of said height cam relative to the horizontal, a cam follower roller journalled relative to said hopper at a distance from said vertical axis, and positioned to roll on said height cam, torsion spring means acting on said hopper substantially centering said cam follower roller on said height cam, an eccentric mass journalled relative to said hopper at a distance from said vertical shaft, and a motor connected to rotate said eccentric mass to impart arcuate vibration so said hopper to cause said cam follower to ride up on said height cam to impart vertical vibration to said hopper to cause any parts in said hopper to be vibrationally advanced up said spiral ramp to said discharge opening.

12. A vibratory hopper feeder, comprising, in combination, a base, a hopper carried on said base for arcuate and vertical vibratory movemets about a vertical axis, a spiral ramp in the perimeter of said hopper spiraling upwardly from a smaller diameter at the bottom of said hopper to a larger diameter at the top of said hopper, a discharge opening at the upper end of said spiral ramp to discharge parts carried in said hopper and conveyed up said spiral ramp, a standard on said base, a height cam carried in said standard, a means to adjust the angle of said height cam relative to the horizontal, a cam follower roller journalled relative to said hopper at a distance from said vertical axis and positioned to roll on said height cam, torsion spring means acting on said hopper substantially centering said cam follower roller on said height cam, a mass shaft journalled on a vertical axis relative to said hopper at a distance from said vertical axis of said hopper, an eccentric mass fiixed eccentrically on said mass shaft, and a motor connected to drive said mass shaft to rotate said eccentric mass to impart arcuate vibration to said hopper to cause said cam follower to ride up on said height cam to impart vertical vibration to said hopper to cause any parts in said hopper to be vibrationally advanced up said spiral ramp to said discharge opening.

13. A vibratory hopper feeder, comprising, in combination, a base, a vertical main shaft journalled on said base for rotating and vertical sliding movements, a hopper fixed on the upper end of said shaft, a spiral ramp in the perimeter of said hopper spiraling upwardly from a smaller diameter at the bottom of said hopper to a larger diameter at the top of said hopper, a discharge opening at the upper end of said spiral ramp to discharge parts carried in said hopper and conveyed up said spiral ramp, a standard on said base, a height cam carried in said standard, means to adjust the angle of said height cam relative to the horizontal, a cam follower roller journalled relative to said hopper at a distance from said main shaft and positioned to roll on said height cam, torsion spring means acting on said hopper substantially centering said cam follower roller on said height cam, a lateral arm extending from and fixed to said shaft, a mass shaft journalled on a vertical axis on the outboard end of said lateral arm, an eccentric mass fixed eccentrically on said mass shaft, and a motor connected to drive said mass shaft to rotate said eccentric mass to impart arcuate vibration to said main shaft and hopper to cause said cam follower to ride up on said height cam to impart vertical vibration to said main shaft and hopper to cause any parts in said hopper to be vibrationally advanced up said spiral ramp to said discharge opening.

14. A vibratory hopper feeder, comprising, in combination, a base, a vertical main shaft journalled on said base for rotating and vertical sliding movements, a hopper fixed on the upper end of said shaft, a spiral ramp in the perimeter of said hopper spiraling upwardly from a smaller diameter at the bottom of said hopper to a larger diameter at the top of said hopper, a discharge opening at the upper end of said spiral ramp to discharge parts carried in said hopper and conveyed up said spiral ramp, first and second standards on said base diametrically opposite relative to said shaft, a cylindrical plug journalled in each said standard, a height cam formed in an inner face of each said cylindrical plug, screw means to adjustably clamp each said cylindrical plug in the respective standard at different positions to adjust the angle of each said height cam relative to the horizontal, first and second arms depending from said hopper, a cam follower roller journalled on the end of each said depending arm and positioned to roll on the respective height cam in said first and second standards, torsion spring means acting on each said depending arm substantially centering said cam follower rollers on said height cams, a lateral arm extending from the bottom of said shaft, a mass shaft journalled on a vertical axis on the outboard end of said lateral arm, an eccentric mass fixed eccentrically on said mass shaft, a motor fixed on said base, and a belt drive from said motor to said mass shaft to rotate said eccentric mass to impart arcuate vibration to said main shaft and hopper to cause said cam followers to ride up on said height cams to impart vertical vibration to said main shaft and hopper to cause any parts in said hopper to be vibrationally advanced up said spiral ramp to said discharge opening.

References Cited by the Examiner
UNITED STATES PATENTS

| | | | |
|---|---|---|---|
| 2,374,664 | 5/45 | Carrier | 198—220 |
| 2,690,835 | 10/54 | Carrier | 198—220 |
| 2,967,434 | 1/61 | Mahlfeldt et al. | 198—200 X |
| 3,032,174 | 5/62 | Lake et al. | 198—220 |

LOUIS J. DEMBO, *Primary Examiner.*